H. GROM,

Assignor of one-half to J. GROM.

PROCESS OF FORMING SHEET METAL ARTICLES.

No. 10,356. Reissued July 10, 1883.

Attest:
Chas. F. Kerr.
F. F. Campbell.

Inventor:
Henry Grom,
by Drake & Co. Attys.

N. PETERS, Photo-Lithographer, Washington, D. C.

UNITED STATES PATENT OFFICE.

HENRY GROM, OF NEWARK, NEW JERSEY, ASSIGNOR OF ONE-HALF TO JOHN GROM, OF SAME PLACE.

PROCESS OF FORMING SHEET-METAL ARTICLES.

SPECIFICATION forming part of Reissued Letters Patent No. 10,356, dated July 10, 1883.

Original No. 264,150, dated September 12, 1882. Application for reissue filed June 2, 1883.

*To all whom it may concern:*

Be it known that I, HENRY GROM, of Newark, in the county of Essex and State of New Jersey, have invented a new and useful improvement in the process of forming sheet-metal articles, or of forming articles from sheet metal.

My invention relates to an improved process of forming articles from sheet metal, whereby a greater variety may be made, and in forms and shapes not practicable by any former process. Formerly spinning has been done on a split chuck, that might be taken out in sections after the shell has been produced; but many shapes would not allow of taking out even a divided chuck, and many articles had to be made in two or more parts and then to be spun or soldered together; but I make all varieties of shapes from one piece of metal; and my invention consists in the process, substantially as hereinafter set forth.

Figure 1:
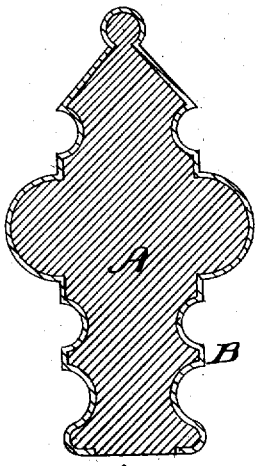
Figure 1:
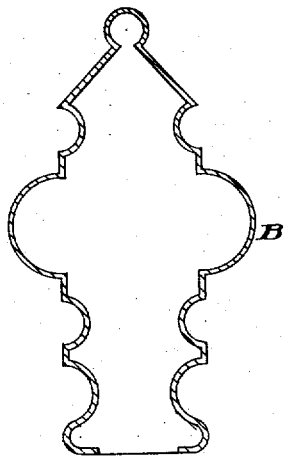

Figure 1 shows an article spun up from one piece of metal having the form on which it has been spun yet in it. Fig. 2 shows the article with the form removed.

In my process I make a form of the desired shape. This I may get, in the first place, by turning it out of wood or metal for a pattern, or by taking for a pattern any article that has been spun in two or more pieces, and from this pattern I construct forms, one way being by molding or casting in materials capable of being melted, such as soft metal that may be fused at a low temperature. Over these latter forms, which are lettered A in the drawings, I spin or otherwise shape the shell B, and when a sufficient number are thus shaped I subject them to heat, either in an oven or metal bath or otherwise, and melt out the fusible forms, and this does not disturb the shells B, as they require a much higher temperature.

What I claim as my invention is—

1. The process of forming sheet-metal articles, consisting in spinning them over soft-metal forms, and then melting out the said forms, substantially as and for the purpose specified.

2. The process of forming articles of sheet metal, consisting in making from fusible material a form having the shape desired for the finished article, placing sheet metal on this form and working it over and to the shape of the form, and then melting out the form, substantially as set forth.

In testimony that I claim the foregoing I have hereunto set my hand.

HENRY GROM.

Witnesses:

CHARLES H. PELL,

JOHN GROM.